United States Patent
Kinoshita et al.

(10) Patent No.: US 6,454,849 B1
(45) Date of Patent: Sep. 24, 2002

(54) HYDRAULIC CEMENT COMPOSITIONS AND ADDITIVES THEREFOR

(75) Inventors: Mitsuo Kinoshita; Eiji Iiba; Toyozi Miura, all of Aichi (JP)

(73) Assignee: Takemoto Yushi Kabushiki Kaisha, Aichi (JP)

( * ) Notice: Subject to any disclaimer, the term of this patent is extended or adjusted under 35 U.S.C. 154(b) by 0 days.

(21) Appl. No.: 09/918,777

(22) Filed: Jul. 30, 2001

(51) Int. Cl.$^7$ ................................................ C04B 24/00

(52) U.S. Cl. ........................ 106/717; 106/724; 106/727; 106/823

(58) Field of Search ................................. 106/717, 724, 106/727, 823

(56) References Cited

U.S. PATENT DOCUMENTS

| | | | | | |
|---|---|---|---|---|---|
| 5,779,788 A | * | 7/1998 | Berke et al. | ................. | 106/809 |
| 5,938,835 A | * | 8/1999 | Shawl et al. | ................. | 106/724 |
| 6,258,162 B1 | * | 7/2001 | Kawakami et al. | ......... | 106/810 |

* cited by examiner

*Primary Examiner*—Paul Marcantoni
(74) *Attorney, Agent, or Firm*—Beyer Weaver & Thomas LLP

(57) ABSTRACT

An additive consisting of (poly)ethyleneglycol monocycloalkylether of a specified kind, (poly)alkyleneglycol or (poly)alkyleneglycol monoalkylether of another specified kinds, an organic phosphoric acid ester of still another specified kind and an antifoaming agent in a specified ratio, when used at a specified ratio, can provide hydraulic cement compositions with reduced bleeding of water after the placing and reduced dry shrinkage of hardened objects.

17 Claims, No Drawings

HYDRAULIC CEMENT COMPOSITIONS AND ADDITIVES THEREFOR

BACKGROUND OF THE INVENTION

This invention relates to hydraulic cement compositions and additives therefor. It is important to improve the durability of objects obtained by hardening a hydraulic cement composition such as mortars and concrete, and it is particularly so if such hardened objects are to be used as base or skeletal materials in a civil engineering and constructional project. Among the commonly known causes of lowering the durability of a hardened object obtained from a hydraulic cement composition are (1) the weakening of the surface layer of the hardened object due to bleeding of water after the placing of hydraulic cement composition, (2) the cracking of the hardened object due to dry shrinkage, and (3) the destruction of the hardened object due to freezing and thawing in cold places. In order to improve the durability of hardened objects obtained by hardening a hydraulic cement composition, it is necessary to inhibit the occurrence of such causes. It is therefore an object of this invention to provide additives for hydraulic cement compositions for inhibiting the occurrence of these causes for lowering the durability of such hardened objects.

Examples of earlier proposed additives for hydraulic cement compositions for inhibiting the occurrence of causes for lowering the durability of such hardened objects include (1) polyalkyleneglycol alkylether or polyalkyleneglycol cycloalkylether (as disclosed in Japanese Patent publications Tokko 56-51148 and 59-3430 and U.S. Pat. No. 4,547,223), (2) aliphatic or alicyclic alcohol with 4 or 5 carbon atoms (as disclosed in Japanese Patent Publication Tokko 6-6500 and U.S. Pat. No. 5,181,961), (3) organic esters of phosphoric acid such as alkyl phosphoric acid ester, polyoxyethylene alkylether phosphoric acid ester and polyoxyethylene alkylphenylether phosphoric acid ester (as disclosed in Japanese Patent Publication Tokko 53-37251), and (4) compositions comprised of polypropyleneglycol with average molecular weight of 100–800, alkyl phosphoric acid ester and an antifoaming agent (as disclosed in Japanese Patent Publication Tokko 1-23430 and U.S. Pat. No. 5,938,835). Although these earlier proposed additives are fairly effective in reducing the drying shrinkage of hardened objects or making hardened objects more resistive against freezing and thawing, their effects are not sufficiently manifested, in particular for inhibiting the bleeding after the placing which causes the weakening of the surface layer of a hardened object.

SUMMARY OF THE INVENTION

It is therefore an object of this invention to provide an additive for hydraulic cement compositions capable of not only sufficiently reducing the bleeding of water after the placement of a hydraulic cement composition and the drying shrinkage of hydraulic cement compositions but also providing sufficient resistance to hardened objects against effects of freezing and thawing.

This invention is based on the inventors' discovery as a result of research carried out in view of the above that such object can be achieved with additives consisting of four specified components at specified ratio.

DETAILED DESCRIPTION OF THE INVENTION

The invention relates to additives for hydraulic cement compositions characterized as comprising 5–95 weight % of Component A described below, 5–95 weight % of Component B described below, 0.1–10 weight % of Component C described below and 0.01–2 weight % of component D described below for a total of 100 weight %, where Component A is (poly)ethyleneglycol monocycloalkylether shown by Formula 1 given below, Component B is (poly)alkyleneglycol or (poly)alkyleneglycol monoalkylether shown by Formula 2 given below, Component C is an organic phosphoric acid ester given by Formula 3 or Formula 4 given below, and Component D is an antifoaming agent, wherein

Formula 1

Formula 2

Formula 3

Formula 4 wherein $R^1$ is cyclopentyl group or cyclohexyl group, $R^2$ is H or alkyl group with 1–6 carbon atoms, $R^3$ and $R^4$ are each alkyl group with 8–18 carbon atoms, $A^1$ is a residual group obtained by removing all hydroxyl groups from (poly)ethyleneglycol having (poly)oxyethylene group composed of 1–4 oxyethylene units, residual group obtained by removing all hydroxyl groups from (poly)propyleneglycol having (poly)oxypropylene group composed of 1–10 oxypropylene units, or residual group obtained by removing all hydroxyl groups from polyalkyleneglycol having polyoxyalkylene group composed of a total of 2–14 oxyethylene units and oxypropylene units, $A^2$ is (poly)oxypropylene group with 1–5 oxypropylene units, $M^1$, $M^2$, $M^3$ and $M^4$ are each H, alkali metal, alkali earth metal, ammonium or organic amine, and n is an integer 1–5. The invention also relates to hydraulic cement compositions characterized as having 0.5–10 weight parts of such an additive added to 100 weight parts of cement.

Aforementioned Component A according to this invention is (poly)ethyleneglycol monocycloalkylether shown by Formula 1. Examples of such (poly)ethyleneglycol monocycloalkylether include (1) ethyleneglycol monocyclopentylether with one oxyethylene unit in its molecule, (2) polyethyleneglycol monocyclopentylether with ethyleneglycol monocyclohexylether with one oxyethylene unit in its molecule, and (4) polyethyleneglycol monocyclohexylether with polyoxyethylene group composed of 2–5 oxyethylene units in its molecule. Particularly preferable among these are (poly)ethyleneglycol monocyclopentylether and (poly)ethyleneglycol monocyclohexylether with (poly)ethylene group composed of 1–3 oxyethylene units in the molecule.

Aforementioned Component B according to this invention is (poly)alkyleneglycol or (poly)alkyleneglycol monoalkylether shown by Formula 2. Examples of such (poly)alkyleneglycol include (1) (poly)ethyleneglycol with (poly)oxyethylene group composed of 1–4 oxyethylene units in the molecule, (2) (poly)propyleneglycol with (poly)oxypropylene group composed of 1–10 oxypropylene units in the molecule, and (3) polyalkyleneglycol with polyoxyalkylene group composed of a total of 2–14 oxyethylene units and oxypropylene units in the molecule. Examples of (poly)alkyleneglycol monoalkylether include (4) (poly)ethyleneglycol monoalkylether obtained by closing one end of (poly)ethyleneglycol of (1) with alkyl group with 1–6 carbon atoms, (5) (poly)propyleneglycol monoalkylether obtained by closing one end of (poly)propyleneglycol of (2) with alkyl group with 1–6 carbon atoms, and (6) polyalkyleneglycol monoalkylether obtained by closing one end of polyalkyleneglycol of (3) with alkyl group with 1–6 carbon atoms. In the cases of (3) and (6), the combination mode of oxyethylene and oxypropylene units may be either random combination or block combination. Particularly preferable among the above is polyalkyleneglycol monoalkylether with polyoxyalkylene group composed of a total of 4–13 oxyethylene units and oxypropylene units in the molecule.

Aforementioned Component C according to this invention is organic phosphoric acid ester shown by Formula 3 or Formula 4. Examples of organic phosphoric acid ester shown by Formula 3 include alkyl phosphoric acid monoesters where $M^1$ and $M^2$ in Formula 3 are both H, their alkali metal salts, their alkali earth metal salts, their ammonium salts and their organic amine salts, all having alkyl group with 8–18 carbon atoms. Examples of organic phosphoric acid ester shown by Formula 4 include (poly)oxypropylene monoalkylether phosphoric acid monoesters where $M^1$ and $M^2$ in Formula 4 are both H, their alkali metal salts, their alkali earth metal salts, their ammonium salts and their organic amine salts, all having alkyl group with 8–18 carbon atoms and (poly)oxypropylene group composed of 1–5 oxypropylene units in the molecule. Particularly preferable among them are alkali metal salts of polyoxypropylene monoalkylether phosphoric acid monoesters which are organic phosphoric acid esters shown by Formula 4, having alkyl group with 10–16 carbon atoms and (poly)oxypropylene group composed of 1–5 oxypropylene units in the molecule.

Organic phosphoric acid monoesters shown by Formula 3 may be obtained by a known method. Alkyl phosphoric acid monoesters shown by Formula 3 where $M^1$ and $M^2$ are both H can be obtained, for example, by reacting anhydrous phosphoric acid with higher alcohol with 8–18 carbon atoms and thereafter using an organic solvent for recrystallization. Alkali metal salts of alkyl phosphoric acid monoester can be obtained by neutralizing the alkyl phosphoric acid monoester thus obtained with alkali hydroxide. Organic phosphoric acid monoesters shown by Formula 4 can be obtained by using (poly)oxypropylene monoalkylether instead of higher alcohol in the method above.

Aforementioned Component D according to this invention is an antifoaming agent. Antifoaming agents of known kinds can be used for the purpose of this invention. Examples of such antifoaming agent include (1) polyether antifoaming agents including alkylene oxide adducts of higher aliphatic acids such as oleic acid and stearic acid, alkylene oxide adducts of higher aliphatic alcohol such as stearyl alcohol and oleyl alcohol, and ethylene oxide adducts of polypropyleneglycol, (2) silicone antifoaming agents such as dimethyl silicone, polyether modified silicone, phenyl modified silicone and trifluoropropyl modified silicone, and (3) trialkylphosphoric acid ester antifoaming agents such as tributyl phosphoric acid ester and tripentyl phosphoric acid ester. Preferable among them is polyether modified silicone having polyether group composed of oxyethylene units, oxypropylene units or oxyethylene and oxypropylene units as modified group. Even more preferable is polyether modified silicone having polyether group composed of oxyethylene and oxypropylene groups as modifying group. Examples of commercially available polyether modified silicone include KS-537 and KS-538 (tradenames) produced by Shinetsu Chemical Co., Ltd. BY28–503 (tradename) produced by Toray Dow Corning Co., Ltd., TSF4452 and TSF4453 (tradenames) produced by Toshiba Silicone Co., Ltd. and FZ-5609 (tradename) produced by Nippon Unicar Co., Ltd.

Additives according to this invention consist of Components A, B, C and D as explained above, containing Component A by 5–95 weight % and preferably by 10–90 weight %, Component B by 5–95 weight % and preferably by 10–90 weight %, Component C by 0.1–10 weight % and preferably by 0.5–5 weight %, and Component D by 0.01–2 weight % and preferably by 0.1–1.2 weight % for a total of 100 weight %.

Hydraulic cement compositions according to this invention include mortars comprising cement, fine aggregates and water, as well as concrete further comprising coarse aggregates, with an additive as described above added in an amount of 0.5–10 weight parts, and preferably 1–8 weight parts to 100 weight parts of cement.

Examples of cement which may be used for the production of hydraulic cement compositions according to this invention include not only various kinds of portland cement such as normal cement, high early strength portland cement and moderate heat portland cement, but also mixed cement such as blast furnace slag cement, fly ash cement and silica fume cement. Examples of fine aggregates include river sand, pit sand, sea sand and crushed sand. Examples of coarse aggregates include river gravels, crushed stone and light-weight aggregates.

For increasing resistance against freezing and thawing of hardened objects obtained from hydraulic cement compositions, it is preferable to adjust the entrained air content to 5–12 volume % in the case of mortar and 3–6 volume % in the case of concrete. The entrained air content can be adjusted by appropriately varying within a specified range the amount of the additive to be added with respect to the amount of cement and according to the kind of such additive and in particular to the kind of the antifoaming agent of Component D.

Additives of other kinds such as a cement dispersant, a setting accelerator, a setting retardant, a water-proofing agent, an antiseptic agent and an anti-rust agent may be also added to hydraulic cement compositions of this invention as long as the effects required of the present invention are not adversely affected.

Six additives embodying this invention are described next as examples.

(1) Additive for hydraulic cement compositions with 75 weight % of Component A, 22 weight % of Component B, 2.5 weight % of Component C and 0.5 weight % of Component D where:

Component A is polyethyleneglycol monocyclohexylether having in the molecule polyoxyethylene group composed of 2 oxyethylene units;

Component B is polypropyleneglycol having in the molecule polyoxypropylene group composed of 7 oxypropylene units;

Component C is sodium salt of polyoxypropylenedecyether phosphoric acid monoester having in the molecule polyoxypropylene group composed of 3 oxypropylene units; and Component D is polyether modified silicone (BY28–503 (tradename) produced by Toray Dow Corning Co., Ltd. with viscosity 2.5Pa•s at 25° C.)

(2) Additive for hydraulic cement compositions with 50 weight % of Component A, 48.5 weight % of Component B, 1.2 weight % of Component C and 0.3 weight % of Component D where:

Component A is polyethyleneglycol monocyclohexylether having in the molecule polyoxyethylene group composed of 2 oxyethylene units;

Component B is polyalkyleneglycol monobutylether having in the molecule polyoxyalkylene group composed of 2 oxypropylene units and 2 oxyethylene units;

Component C is sodium salt of polyoxypropylenedecylether phosphoric acid monoester having in the molecule polyoxypropylene group composed of 3 oxypropylene units; and Component D is polyether modified silicone (BY28–503 (tradename) produced by Toray Dow Corning Co., Ltd. with viscosity 2.5Pa•s at 25° C.).

(3) Additive for hydraulic cement compositions with 70 weight % of Component A, 25 weight % of Component B, 4.2 weight % of Component C and 0.8 weight % of Component D where:

Component A is polyethyleneglycol monocyclohexylether having in the molecule polyoxyethylene group composed of 2 oxyethylene units;

Component B is polypropyleneglycol having in the molecule polyoxypropylene group composed of 7 oxypropylene units;

Component C is sodium salt of polyoxypropylenedecylether phosphoric acid monoester having in the molecule polyoxypropylene group composed of 3 oxypropylene units; and Component D is polyether modified silicone (TSF4452 (tradename) produced by Toshiba Silicone Co., Ltd. with viscosity 0.9Pa•s at 25° C.).

(4) Additive for hydraulic cement compositions with 60 weight % of Component A, 38.5 weight % of Component B, 1.2 weight % of Component C and 0.3 weight % of Component D where:

Component A is ethyleneglycol monocyclopentylether;

Component B is polyalkyleneglycol monobutylether having in the molecule polyoxyalkylene group composed of 2 oxypropylene units and 2 oxyethylene units;

Component C is sodium salt of oxypropylenedecylether phosphoric acid monoester; and Component D is polyether modified silicone (TSF4452 (tradename) produced by Toshiba Silicone Co., Ltd. with viscosity 0.9Pa•s at 25° C.).

(5) Additive for hydraulic cement compositions with 30 weight % of Component A, 68.5 weight % of Component B, 1.2 weight % of Component C and 0.3 weight % of Component D where:

Component A is polyethyleneglycol monocyclopentylether having in the molecule polyoxyethylene group composed of 2 oxylethylene units;

Component B is polyalkyleneglycol monobutylether having in the molecule polyoxyalkylene group composed of 2 oxypropylene units and 2 oxyethylene units;

Component C is sodium salt of polyoxypropylenedecylether phosphoric acid monoester having in the molecule polyoxypropylene group composed of 3 oxypropylene units; and Component D is polyether modified silicone (TSF4452 (tradename) produced by Toshiba Silicone Co., Ltd. with viscosity 0.9Pa•s at 25° C.).

(6) Additive for hydraulic cement compositions with 70 weight % of Component A, 27.7 weight % of Component B, 1.9 weight % of Component C and 0.4 weight % of Component D where:

Component A is ethyleneglycol monocyclopentylether;

Component B is polyalkyleneglycol monopropylether having in the molecule polyoxyalkylene group composed of 5 oxypropylene units and 1 oxyethylene unit;

Component C is sodium salt of oxypropylenedecylether phosphoric acid monoester; and Component D is polyether modified silicone (BY28–503 (tradename) produced by Toray Dow Corning Co., Ltd. with viscosity 2.5Pa•s at 25° C.).

Hydraulic cement compositions embodying this invention is described as follows.

(7) Concrete obtained by mixing any of the additives (1)–(6) described above with a mixture of cement, fine aggregates and coarse aggregates in an amount of 2–6 weight parts for 100 weight parts of cement such that the entrained air content will be 4–5 volume % and kneading together with water.

Test examples will be described next in order to more clearly describe the invention and its effects but these examples are not intended to limit the scope of the invention. In what follows, "part" will mean "weight part" and "%" will mean "weight %" except where it relates to the quantity of air.

Part 1 (Preparation of additives for hydraulic cement compositions)

TEST EXAMPLE 1

Additive (P-1) was prepared by mixing together 75 parts of polyethyleneglycol monocyclohexylether (a-1) having in the molecule polyoxyethylene group composed of 2 oxyethylene units as Component A, 22 parts of polypropyleneglycol (b-1) having in the molecule polyoxypropylene group composed of 7 oxypropylene units as Component B, 2.5 parts of sodium salt (c-1) of polyoxypropylenedecylether phosphoric acid monoester having in the molecule polyoxypropylene group composed of 3 oxypropylene units as Component C, and 0.5 parts of polyether modified silicone (BY28–503 (tradename) produced by Toray Dow Corning Co., Ltd. with viscosity 2.5Pa•s at 25° C.) (d-1).

TEST EXAMPLES 2–9 AND COMPARISON EXAMPLES 1–16

Additives (P-2)–(P-9) as Test Examples 2–9 and additives (R-1)–(R-16) as Comparison Examples 1–16 were prepared similarly. Compositions of these additives are shown in Tables 1.

TABLE 1

| | A | | B | | C | | D | | Others | |
|---|---|---|---|---|---|---|---|---|---|---|
| | Kind | Part | Kind | Part | Kind | Part | Kind | Part | Kind | Part |
| Test Examples | | | | | | | | | | |
| 1 P-1 | a-1 | 75 | b-1 | 22 | c-1 | 2.5 | d-1 | 0.5 | | |
| 2 P-2 | a-1 | 50 | b-2 | 48.5 | c-1 | 1.2 | d-1 | 0.3 | | |
| 3 P-3 | a-1 | 70 | b-1 | 25 | c-1 | 4.2 | d-2 | 0.8 | | |
| 4 P-4 | a-2 | 60 | b-2 | 38.5 | c-2 | 1.2 | d-2 | 0.3 | | |
| 5 P-5 | a-3 | 30 | b-2 | 68.5 | c-1 | 1.2 | d-2 | 0.3 | | |
| 6 P-6 | a-2 | 70 | b-3 | 27.7 | c-2 | 1.9 | d-1 | 0.4 | | |
| 7 P-7 | a-4 | 80 | b-2 | 17 | c-2 | 2.8 | d-3 | 0.2 | | |
| 8 P-8 | a-1 | 36 | b-1 | 60 | c-1 | 3.7 | d-3 | 0.3 | | |
| 9 P-9 | a-2 | 21.2 | b-1 | 75 | c-3 | 3 | d-1 | 0.8 | | |
| Comparison Examples | | | | | | | | | | |
| 1 R-1 | a-1 | 97 | b-2 | 1.4 | c-3 | 1.5 | d-2 | 0.1 | | |
| 2 R-2 | a-1 | 3.5 | b-1 | 94 | c-2 | 2 | d-1 | 0.5 | | |
| 3 R-3 | a-1 | 1.4 | b-1 | 97 | c-2 | 1.5 | d-1 | 0.1 | | |
| 4 R-4 | a-1 | 94 | b-1 | 3.5 | c-2 | 2 | d-1 | 0.5 | | |
| 5 R-5 | a-1 | 75 | b-1 | 12.5 | c-2 | 12 | d-1 | 0.5 | | |
| 6 R-6 | a-1 | 75 | b-1 | 24.5 | | | d-1 | 0.5 | | |
| 7 R-7 | a-1 | 75 | b-1 | 19 | c-2 | 3 | d-1 | 3 | | |
| 8 R-8 | a-1 | 75 | b-1 | 22 | c-2 | 3 | | | | |
| 9 R-9 | | | b-1 | 29 | c-1 | 0.8 | d-2 | 0.2 | ar-1 | 70 |
| 10 R-10 | | | b-1 | 29 | c-1 | 0.8 | d-2 | 0.2 | ar-2 | 70 |
| 11 R-11 | a-1 | 50 | | | c-2 | 2.5 | d-2 | 0.1 | br-1 | 47.4 |
| 12 R-12 | a-2 | 39.2 | | | c-1 | 0.5 | d-2 | 0.3 | br-2 | 60 |
| 13 R-13 | a-2 | 70 | b-3 | 27.3 | | | d-1 | 0.7 | cr-1 | 2 |
| 14 R-14 | a-4 | 70 | b-2 | 28.8 | | | d-2 | 0.2 | cr-2 | 1 |
| 15 R-15 | a-1 | 75 | b-1 | 24 | | | d-1 | 0.8 | e-1 | 0.2 |
| 16 R-16 | | | b-1 | 94 | c-2 | 5.5 | d-1 | 0.5 | | |

In Table 1:
a-1 Polyethyleneglycol monocyclohexylether having in the molecule polyoxyethylene group composed of 2 oxyethylene units;
a-2 Ethyleneglycol monocyclopentylether;
a-3 Polyethyleneglycol monocyclopentylether having in the molecule polyoxyethylene group composed of 2 oxyethylene units;
a-4 Ethyleneglycol monocyclohexylether;
b-1 Polypropyleneglycol having in the molecule polyoxypropylene group composed of 7 oxypropylene units;
b-2 Polyalkyleneglycol monobutylether having in the molecule polyoxyalkylene group composed of 2 oxypropylene units and 2 oxyethylene units;
b-3 Polyalkyleneglycol monobutylether having in the molecule polyoxyalkylene group composed of 5 oxypropylene units and 1 oxyethylene unit;
c-1 Sodium salt of polyoxypropylenedecylether phosphoric acid monoester having in the molecule polyoxypropylene group composed of 3 oxypropylene units;
c-2 Potassium salt of oxypropylenedodecylether phosphoric acid monoester;
c-3 Potassium salt of tetradecyl phosphoric acid monoester;
d-1 Polyether modified silicone (BY28-503 (tradename) produced by Toray Dow Corning Co., Ltd. with viscosity 2.5 Pa · s at 25° C.);
d-2 Polyether modified silicone (TSF4452 (tradename) produced by Toshiba Silicone Co., Ltd. with viscosity 0.9 Pa · s at 25° C.);
d-3 Alkylene oxide adduct of higher alcohol with 18 carbon atoms (AFK-2 (tradename) produced by Takemoto Yushi Kabushiki Kaisha);
ar-1 Polyethyleneglycol monocyclohexylether having in the molecule polyoxyethylene group composed of 9 oxyethylene units;
ar-2 Cyclopentyl alcohol;
br-1 Polypropyleneglycol having in the molecule polyoxypropylene group composed of 17 oxypropylene units;
br-2 Polyalkyleneglycol monobutylether having in the molecule polyoxyalkylene group composed of 15 oxypropylene units and 6 oxyethylene units;
cr-1 Sodium salt of butyl phosphoric acid ester;
cr-2 Potassium salt of polyoxypropylenedecylether phosphoric acid monoester having in the molecule polyoxypropylene group composed of 8 oxypropylene units;
e-1 Air entraining agent having resinates as principal component (AE-300 (tradename) produced by Takemoto Yushi Kabushiki Kaisha).

Part 2 (Preparation of concrete samples and their physical properties)

Preparation of concrete samples

Normal portland cement (specific weight=3.16, Braine value=3300), fine aggregates (river sand from Abe River with specific weight=2.58) and coarse aggregates (crushed stone from Okazaki with specific weight=2.68) were sequentially fed into a 50-liter pan-type mixer under the conditions shown in Table 2 and kneaded for 15 seconds. Next, the additives shown in Table 1 were each mixed in together with water so as to obtain concrete samples with target slump value of 18±1 cm and target air entraining value of 4.0–5.0% and kneaded. The added amounts of the additives are shown in Table 3.

TABLE 2

| Water/cement ratio (%) | Ratio of fine aggregates (%) | Unit quantity (kg/m³) | | | |
|---|---|---|---|---|---|
| | | Water | Cement | Fine aggregates | Coarse aggregates |
| 56.2 | 46.0 | 180 | 320 | 800 | 976 |

Physical properties

Slump value (SV), air quantity (AQ), bleeding ratio (BR), drying shrinkage ratio (DS), durability index against freezing and thawing (DI) and compressive strength (CS) were measured as follows for each of the prepared concrete samples. The results are also shown in Table 3.

Slump value: Measured according to JIS-A1101;
Air quantity: Measured according to JIS-A1128;
Bleeding ratio: Measured according to JIS-A1123 and calculated by using the measured value in the following formula:

Bleeding ratio (%)=100×(Maximum bleeding water quantity)/(Total water in sample);

Drying shrinkage ratio: Measured according to JIS-A1129 by the comparator method after storing the samples for 26 weeks under the controlled temperature-humidity condition of 20° C. and 60% RH (The smaller this value, the smaller the drying shrinkage);

Durability index against freezing and thawing: Measured according to Appendix 2 to JIS-A1129 and shown in terms of numbers calculated by durability index according to ASTM-C666-75 (The maximum value is 100. The closer the value to 100, the higher the resistance against freezing and thawing);

Compression strength: Measured according to JIS-A1108.
In the above, JIS Japanese Industrial Standards

TABLE 3

| | | | Properties of Concrete | | | | | |
|---|---|---|---|---|---|---|---|---|
| | Additive | | | | | | DS | DI | CS *3 |
| | Kind | Amount *1 | SV (cm) | AQ (%) | BR (%) | *2 (×10⁻⁴) | (300 cycles) | (N/mm²) |
| Test Examples | | | | | | | | |
| 10 | P-1 | 2 | 18.3 | 4.7 | 7.2 | 4.8 | 95.4 | 33.5 |
| 11 | P-2 | 2 | 18.5 | 4.8 | 7.1 | 4.5 | 96.5 | 33.2 |
| 12 | P-3 | 2 | 18.3 | 4.7 | 7.4 | 4.3 | 95.1 | 33.4 |
| 13 | P-4 | 2 | 18.4 | 4.8 | 7.9 | 4.4 | 96.2 | 33.3 |
| 14 | P-5 | 2 | 18.2 | 4.7 | 7.8 | 4.3 | 96.5 | 33.5 |
| 15 | P-6 | 2 | 18.2 | 4.9 | 7.9 | 4.3 | 98.7 | 33.5 |
| 16 | P-7 | 2 | 18.6 | 4.7 | 7.1 | 4.7 | 89.0 | 33.0 |
| 17 | P-8 | 2 | 18.4 | 4.5 | 8.7 | 4.7 | 87.3 | 33.9 |
| 18 | P-9 | 2 | 18.3 | 4.7 | 8.8 | 4.4 | 94.8 | 33.5 |
| 19 | P-1 | 4 | 18.6 | 4.6 | 8.3 | 4.0 | 95.5 | 32.3 |
| 20 | P-3 | 6 | 18.8 | 4.9 | 8.1 | 3.9 | 96.3 | 31.5 |
| Comparison Examples | | | | | | | | |
| 17 | R-1 | 2 | 18.4 | 4.5 | 11.6 | 5.2 | 65.3 | 32.0 |
| 18 | R-2 | 2 | 18.6 | 4.5 | 12.0 | 4.9 | 57.2 | 32.2 |
| 19 | R-3 | 2 | 18.3 | 4.5 | 10.4 | 4.9 | 76.3 | 31.0 |
| 20 | R-4 | 2 | 18.5 | 4.8 | 11.5 | 5.9 | 72.0 | 31.9 |

TABLE 3-continued

| | | | Properties of Concrete | | | | | |
|---|---|---|---|---|---|---|---|---|
| | Additive | | | | | | DS | DI | CS *3 |
| | Kind | Amount *1 | SV (cm) | AQ (%) | BR (%) | *2 (×10⁻⁴) | (300 cycles) | (N/mm²) |
| 21 | R-5 | 2 | 18.3 | 4.5 | 11.3 | 5.4 | 73.5 | 31.2 |
| 22 | R-6 | 2 | 18.3 | 4.6 | 12.8 | 4.8 | 5.6 | 32.4 |
| 23 | R-7 | 2 | 18.3 | 4.5 | 12.7 | 5.1 | 55.3 | 31.1 |
| 24 | R-8 | 2 | 18.2 | 4.7 | 12.0 | 5.1 | 10.2 | 32.2 |
| 25 | R-9 | 2 | 18.4 | 4.6 | 11.3 | 6.1 | 68.3 | 32.0 |
| 26 | R-10 | 2 | 18.3 | 4.5 | 11.0 | 5.6 | 41.2 | 30.9 |
| 27 | R-11 | 2 | 18.5 | 4.8 | 11.1 | 6.0 | 72.0 | 31.9 |
| 28 | R-12 | 2 | 18.7 | 4.9 | 10.8 | 6.3 | 73.5 | 31.3 |
| 29 | R-13 | 2 | 18.5 | 4.7 | 11.2 | 5.0 | 55.0 | 31.7 |
| 30 | R-14 | 2 | 18.3 | 4.6 | 11.0 | 4.7 | 43.5 | 32.0 |
| 31 | R-15 | 2 | 18.3 | 4.6 | 10.6 | 4.8 | 5.6 | 32.4 |
| 32 | R-16 | 2 | 18.3 | 4.7 | 10.2 | 4.9 | 79.3 | 31.8 |

In Table 3:
*1: Number of parts of additive for 100 parts of cement;
*2: Age of sample = 26 weeks;
*3 Age of sample = 28 days.

It should be clear from the above that additives for hydraulic cement compositions according to this invention are capable of not only significantly reducing the bleeding of water after the placing and drying shrinkage of hardened objects but also of improving the resistance of hardened objects against freezing and thawing.

What is claimed is:

1. An additive for hydraulic cement compositions, said additive consisting of 5–95 weight % of Component A, 5–95 weight % of Component B, 0.1–10 weight % of Component C, and 0.01–2 weight % of component D, where Component A is (poly)ethyleneglycol monocycloalkylether shown by Formula 1, Component B is (poly)alkyleneglycol or (poly)alkyleneglycol monoalkylether shown by Formula 2, Component C is an organic phosphoric acid ester given by Formula 3 or Formula 4, and Component D is an antifoaming agent, said Formula 1, said Formula 2, said Formula 3 and said Formula 4 being respectively

  Formula 1

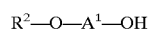  Formula 2

Formula 3
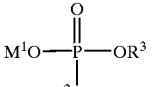

Formula 4
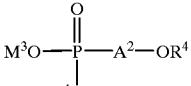

where $R^1$ is cyclopentyl group or cyclohexyl group, $R^2$ is H or alkyl group with 1–6 carbon atoms, $R^3$ and $R^4$ are each alkyl group with 8–18 carbon atoms, $A^1$ is a residual group obtained by removing all hydroxyl groups from (poly)ethyleneglycol having (poly)oxyethylene group composed of 1–4 oxyethylene units, residual group obtained by removing all hydroxyl groups from (poly)propyleneglycol having (poly)oxypropylene group composed of 1–10 oxypropylene units, or residual group obtained by removing all hydroxl groups from polyalkyleneglycol having polyoxyalkylene group composed of a total of 2–14 oxyethylene units and oxypropylene units, $A^2$ is (poly)oxypropylene group with 1–5 oxypropylene units, $M^1$, $M^2$, $M^3$ and $M^4$ are each H, alkali metal, alkali earth metal, ammonium or organic amine, and n is an integer 1–5.

2. The additive of claim 1 consisting of 10–90 weight % of said Component A, 10–90 weight % of said Component B, 0.5–5 weight % of said Component C and 0.1–1.2 weight % of said Component D.

3. The additive of claim 2 wherein said Component A is (poly)ethyleneglycol monocyclopentylether or (poly)ethyleneglycol monocyclohexylether having (poly)oxyethylene group composed of 1–3 oxyethylene units.

4. The additive of claim 2 wherein said Component B is polyalkylglycol monoalkylether having polyoxyalkylene group composed of a total of 4–13 oxyethylene units and oxypropylene units.

5. The additive of claim 2 wherein said Component C is an organic phosphoric acid ester given by Formula 4, $R^4$ is alkyl group with 10–16 carbon atoms, and $M^3$ and $M^4$ are each alkali metal.

6. The additive of claim 2 wherein said Component D is polyether modified silicone.

7. A hydraulic cement composition comprising 100 weight parts of cement and 0.5–10 weight parts of an additive, said additive consisting of 5–95 weight % of Component A, 5–95 weight % of Component B, 0.1–10 weight % of Component C, and 0.01–2 weight % of component D, where Component A is (poly)ethyleneglycol monocycloalkylether shown by Formula 1, Component B is (poly)alkyleneglycol or (poly)alkyleneglycol monoalkylether shown by Formula 2, Component C is an organic phosphoric acid ester given by Formula 3 or Formula 4, and Component D is an antifoaming agent, said Formula 1, said Formula 2, said Formula 3 and said Formula 4 being respectively

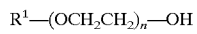 Formula 1

 Formula 2

Formula 3

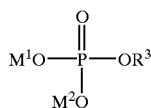

Formula 4

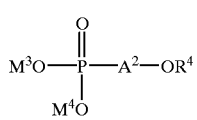

where $R^1$ is cyclopentyl group or cyclohexyl group, $R^2$ is H or alkyl group with 1–6 carbon atoms, $R^3$ and $R^4$ are each alkyl group with 8–18 carbon atoms, $A^1$ is a residual group obtained by removing all hydroxyl groups from (poly)ethyleneglycol having (poly)oxyethylene group composed of 1–4 oxyethylene units, residual group obtained by removing all hydroxyl groups from (poly)propyleneglycol having (poly)oxypropylene group composed of 1–10 oxypropylene units, or residual group obtained by removing all hydroxl groups from polyalkyleneglycol having polyoxyalkylene group composed of a total of 2–14 oxyethylene units and oxypropylene units, $A^2$ is (poly)oxypropylene group with 1–5 oxypropylene units, $M^1$, $M^2$, $M^3$ and $M^4$ are each H, alkali metal, alkali earth metal, ammonium or organic amine, and n is an integer 1–5.

8. The hydraulic cement composition of claim 7 wherein said additive consists of 10–90 weight % of said Component A, 10–90 weight % of said Component B, 0.5–5 weight % of said Component C and 0.1–1.2 weight % of said Component D.

9. The hydraulic cement composition of claim 8 wherein said Component A is (poly)ethyleneglycol monocyclopentylether or (poly)ethyleneglycol monocyclohexylether having (poly)oxyethylene group composed of 1–3 oxyethylene units.

10. The hydraulic cement composition of claim 8 wherein said Component B is polyalkylglycol monoalkylether having polyoxyalkylene group composed of a total of 4–13 oxyethylene units and oxypropylene units.

11. The hydraulic cement composition of claim 8 wherein said Component C is an organic phosphoric acid ester given by Formula 4, $R^4$ is alkyl group with 10–16 carbon atoms, and $M^3$ and $M^4$ are each alkali metal.

12. The hydraulic cement composition of claim 8 wherein said Component D is polyether modified silicone.

13. The hydraulic cement composition of claim 8 which is concrete, said additive being added in an amount such that said concrete has an entrained air content of 3–6 volume %.

14. The hydraulic cement composition of claim 9 which is concrete, said additive being added in an amount such that said concrete has an entrained air content of 3–6 volume %.

15. The hydraulic cement composition of claim 10 which is concrete, said additive being added in an amount such that said concrete has an entrained air content of 3–6 volume %.

16. The hydraulic cement composition of claim 11 which is concrete, said additive being added in an amount such that said concrete has an entrained air content of 3–6 volume %.

17. The hydraulic cement composition of claim 12 which is concrete, said additive being added in an amount such that said concrete has an entrained air content of 3–6 volume %.

* * * * *